Aug. 11, 1959   S. TYSZKIEWICZ   2,899,504
ELECTRICAL IMPULSE RELEASED SELECTOR
Filed Dec. 10, 1956   3 Sheets-Sheet 1
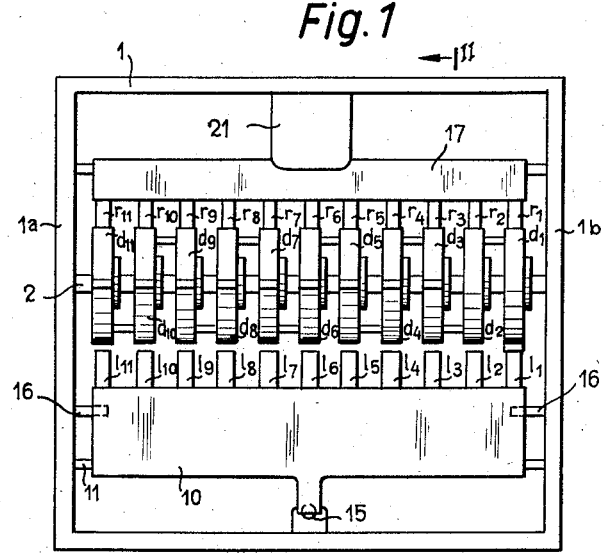
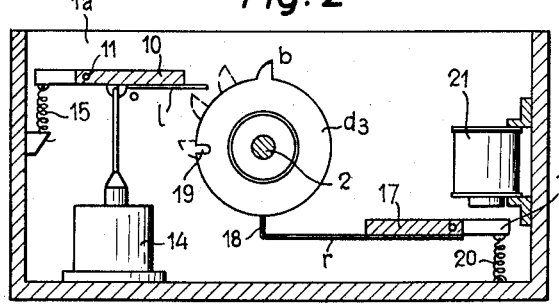
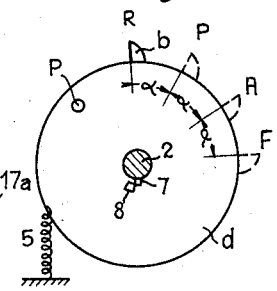
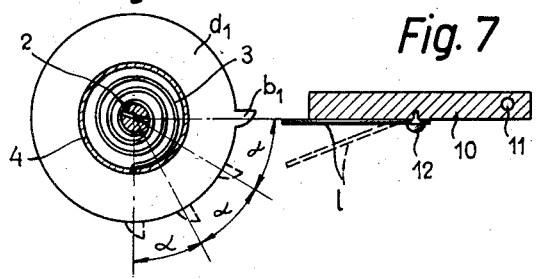
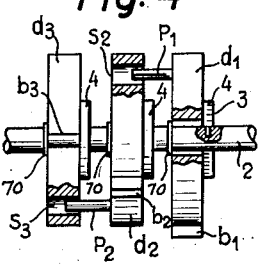

Aug. 11, 1959 S. TYSZKIEWICZ 2,899,504
ELECTRICAL IMPULSE RELEASED SELECTOR
Filed Dec. 10, 1956 3 Sheets-Sheet 2
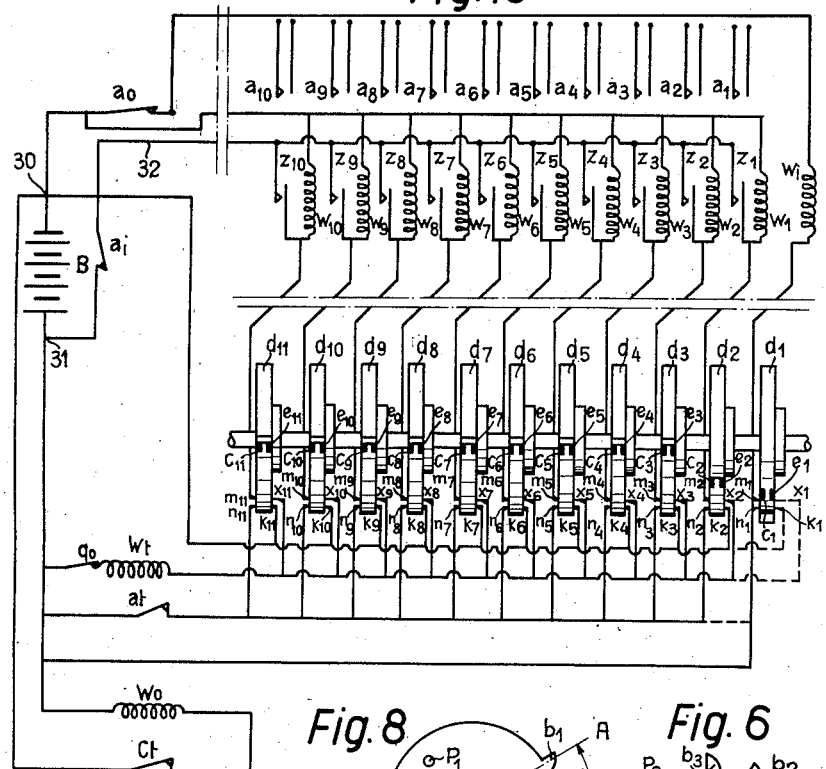
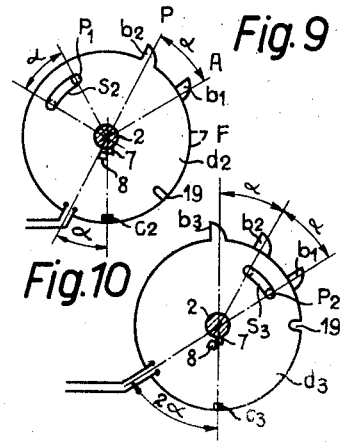
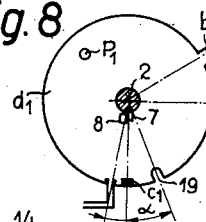
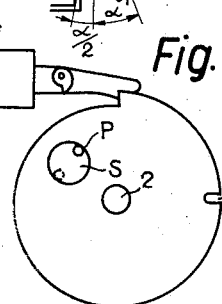
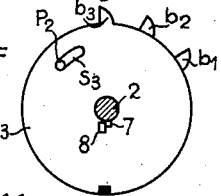
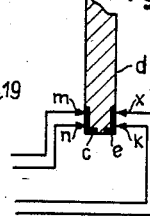
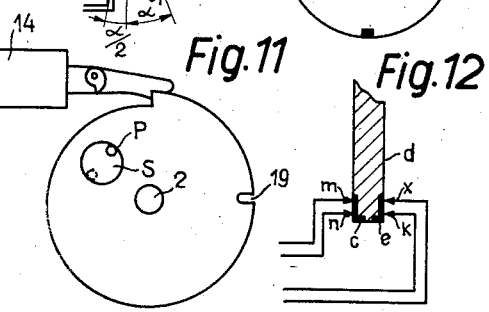

Aug. 11, 1959 S. TYSZKIEWICZ 2,899,504
ELECTRICAL IMPULSE RELEASED SELECTOR
Filed Dec. 10, 1956 3 Sheets-Sheet 3

United States Patent Office 2,899,504
Patented Aug. 11, 1959

2,899,504

ELECTRICAL IMPULSE RELEASED SELECTOR

Stefano Tyszkiewicz, Rome, Italy

Application December 10, 1956, Serial No. 627,239

Claims priority, application Italy December 10, 1955

15 Claims. (Cl. 179—27.51)

This invention relates to a selector adapted to be released by electrical impulses for use in telephone systems or selective remote control transmission to utilising machines, such as electrical dictating machines, machine tools and the like.

The improved selector comprises a plurality of adjacent members adapted to be moved in the same direction with respect to a common rigid support. Spring means for each member tend to hold it in a given starting position. A movable propelling member common to all said members for displacing them against the action of said resilient means, a relay adapted to receive electrical impulses for actuating said propelling member every time an electrical impulse is transmitted to the relay, an engaging member for each of said members adapted to be engaged by said propelling member when the said members are in a given position with respect to the rigid support, in order to move said members to a given end position is also employed. The device also has a stop member common to all members adapted to hold in the end position each of said members, an electromagnetic relay adapted to release on energization thereof the member held in the said end position, a contact in the supply circuit for said relay, a time relay cooperating with a plurality of contacts, each of which is closed through the displacement of one of the said members. Interengaging means on adjacent members to permit of an independent relative displacement of the said members by an extent not exceeding the length over which the said propelling member is capable of moving each of the said members is used for bringing them to their abovementioned end position.

Further characteristic features and advantages of this invention will be understood from the appended description referring to the accompanying drawing which shows by way of example only some embodiments thereof, and wherein:

Figure 1 is a plan view of an embodiment of the improved selector;

Figure 2 is a sectional view on line II—II of Figure 1,

Figure 14:
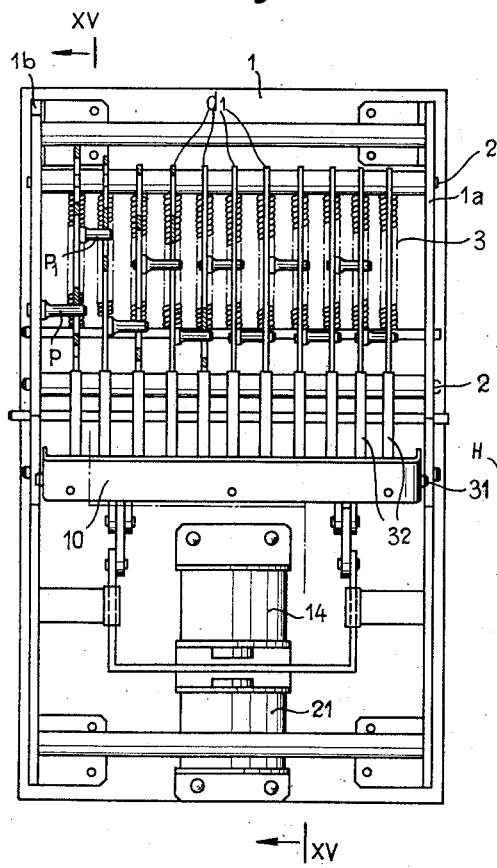
Figure 15:
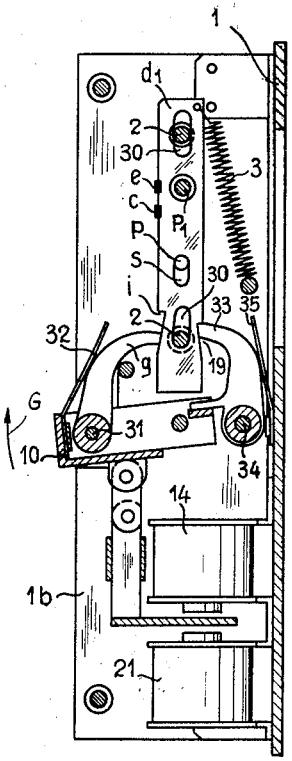

Figure 3 is a diagrammatical side view of a movable selector member shown in Figure 1, Figure 4 is a part sectional side view of a constructional detail of the selector shown on Figure 1, Figure 5 is a side view, Figure 6 is a further side view, Figure 7 is a sectional view of a further constructional detail of the apparatus shown in Figure 1, Figures 8 to 10 are side views of three contiguous movable members associated with the structure shown in Figure 1, Figure 11 is a side view of one of the abovementioned movable members according to a modification, Figure 12 is a sectional view of a constructional detail of the selector, and Figure 13 shows diagrammatically an electric circuit of the improved selector cooperating with an external utilising circuit as a practical embodiment of the improved device, Figures 14 and 15 show diagrammatically of a modified embodiment of the invention.

In Figures 1 and 2 which show the device in its inoperative position, 1 denotes the frame, 2 a shaft secured by its ends to the opposite side walls $1a$ and $1b$ of the frame. The shaft has mounted thereon equally spaced eleven discs $d_1 \ldots d_{11}$ made of metal or an insulating material, according to requirements.

The discs (Figures 3 and 4) are each connected to the shaft by means of a spiral spring 3 secured at one end to the disc and at its other end to the shaft 2. The springs 3 are encircled by a cylindrical sheath 4 extending beyond one side of each disc.

The spring 3 can of course be substituted for, say, by a spring of the type denoted by 5 in Figure 3.

Axial displacement of the discs is prevented for instace by a washer 70 secured in a groove in the shaft 2 or equivalent means.

The discs $d_1 \ldots d_{11}$ are each formed in their periphery with a tooth or projection $b_1 \ldots b_{11}$, respectively. The spring (3 or 5) associated with each disc tends to move them all in the same (anti-clockwise in Figure 2) direction, till each disc takes a given position through the provision of a stop in the form of a small tooth 7 (Figures 3, 6 and 8 to 10) fast with a side wall of the disc which bears on a projection 8 suitably located on the shaft 2. The stops opposing the action of the springs acting on the discs are arranged in such manner that the teeth on the discs $d_3 \ldots d_{11}$ are aligned with one another and are located, for instance, at the top of the discs, the teeth $b_1$ and $b_2$ and the discs $d_1$ and $d_2$ being angularly spaced from the remaining teeth, the $\alpha$ angle between the teeth $b_2$ and $b_3$ being exactly the same as the angle spacing the teeth $b_2$ and $b_1$ (Figures 3, 5, 8, 9 and 10).

It will be seen that the discs $d_3 \ldots d_{11}$, $d_2$ and $d_1$ occupy three distinct positions which are equally angularly spaced. These positions shall be referred to hereafter as "inoperaitve," "preparatory" and "waiting" positions. All the discs can take in a manner which shall be described hereafter, the so called "end position" which is angularly spaced from the waiting position through an angle equalling the angle $\alpha$ through which the three first-mentioned positions are relatively spaced. In order to reach this position the disc $d_1$ should rotate through an angle $\alpha$, the disc $d_2$ through an angle $2\alpha$ first going through its waiting position, and each of the discs $d_3 \ldots d_{11}$ shall rotate through an angle $3\alpha$ successively going through their "preparatory" and "waiting" positions. The four abovementioned positions are denoted on the drawings by R, P, A and F.

Each disc $d_1 \ldots d_{10}$ carries on its side facing the wall $1a$ of the frame (Figure 1) a pivot $p_1 \ldots p_{10}$, respectively, the free end of which is engaged by an opening or slot $s_2 \ldots s_{11}$ bored in the discs $d_2 \ldots d_{11}$. The slots $s_2 \ldots s_{11}$, which may be of any desired shape, such as a circular shape, are each of a width such as to permit an oscillation of the pin $p$, the free end of which is engaged thereby, hence of the disc carrying the said pin with respect to the disc in which the slot is cut, through an angle $\alpha$ equalling the angular spacing of the various positions R, T, A and F of the disc described above.

The pins $p_1$ and $p_2$ on the discs $d_1$ and $d_2$ are situated with respect to their cooperating slots $s_2$ and $s_3$ in the discs $d_2$ and $d_3$ in angular positions such that as the discs $d_1$ go over from the position A to the position F, the disc $d_2$ goes over from position P to position A, the disc $d_3$ simultaneously going over from position R to position P.

Conversely, the pins $p_3 \ldots p_{10}$ on the discs $d_3 \ldots d_{10}$ are located with respect to their cooperating slots $s_4 \ldots s_{11}$ in the discs $d_4 \ldots d_{11}$ in angular positions such that movement of each of the discs $d_3 \ldots d_{11}$ from the position R to the position P does not rotate the next disc, which is one of the discs $d_4 \ldots d_{11}$. This rotation merely occurs on movement of the individual discs $d_3 \ldots d_{10}$ from the position P to the position A and from position A to position F. The position of the pins and their respective slots in the discs $d_1$, $d_2$ and $d_3$ is visible in Figures 8, 9 and 10.

In the example shown the pins on the successive discs as well as the slots adapted to receive said pins are angularly spaced through 180°. However, it will be obvious that the arrangement of the pins and slots can be selected at will, provided special operating conditions of the selector, which shall be dealt with hereafter, are met.

10 denotes an elongated plate mounted for oscillation on a shaft 11 having a plurality of blades $l_1 \ldots l_{11}$ each arranged in front of one of the discs $d_1 \ldots d_{11}$. The length of the blades secured to the plate 10 in the manner shown in Figure 7 by means of a screw 12 is such as to afford a greater rigidity on oscillation of the plate 10 towards the bottom of the frame 1 and a higher elasticity on its backward oscillation. The length of each blade is made such that the blade ends can engage the tooth on the corresponding disc which is in the A position, as the plate 10 is oscillated by the action of the relay 14 receiving electrical impulses from the outside. A spring 15 returns the plate 10 after each oscillation with its blades to its initial position shown in Figure 2.

16 denotes pins secured to the side walls $1a$ and $1b$ of the frame 1 and serving as end abutments for the oscillation of the plate 10. On the other side of the set of discs $d_1 \ldots d_{11}$ a further plate 17 is mounted for oscillation on the walls $1a$ and $1b$ of the frame, the said plate 17 being provided with a plurality of resilient blades $r_1 \ldots r_{11}$. The resilient blades $r$ are each provided with a tooth 18, the associated discs being each formed with a peripheral groove 19 arranged in such manner that the tooth 18 is engaged thereby as the disc reaches its position F. The teeth 18 on the abutment blades $r$ are each pressed against the periphery of the associated disc by the action of a spring 20 interposed between the bottom of the frame 1 and projection $17a$ on the plate 17. 21 denotes the electromagnet which on energization draws the projection $17a$ on the plate 17, which is made to this effect of a magnetic material, and rocks the plate 17 against the resilient action of the spring 20 simultaneously releasing all the teeth 18 from the slots 19 in the discs in the position S.

The discs $d_1 \ldots d_{11}$ of the selector each carry a pair of contacts $c$, $e$, respectively, movable therewith, each contact being adapted to cooperate with a pair of stationary contacts $m$, $n$ and $k$, $x$, respectively. This structure of course requires the disc to be made of insulating material. An embodiment of this arrangement is shown in Figure 12, in which the movable contacts are shown in their operative position, in which they interconnect the stationary contacts $m$, $n$ and $k$, $x$, respectively, thereby closing a circuit which shall be described in detail hereafter. It is understood that any equivalent arrangement may be adopted without departing from the scope of this invention. In the embodiment described, the relative angular position of the stationary and movable contacts is such that, when the selector is in its inoperative position shown on the drawings, the movable contacts $c_1$ and $e_1$ on the disc $d_1$ are angularly spaced from the stationary contacts $m_1$, $n_1$ and $k_1$, $x_1$ through an angle smaller than the angle through which the said disc should rotate for going over from position A to position F, say, through an angle $$\frac{\alpha}{2}$$

The contacts $c_2$ and $e_2$ on the disc $d_2$ are spaced from the stationary contacts $m_2$, $n_2$ and $k_2$, $x_2$ through an angle $\alpha$ and the contacts $c_3 \ldots c_{11}$ and $e_3 \ldots e_{11}$ on the discs $d_3 \ldots d_{11}$ are spaced through an angle $2\alpha$.

This means that on going over of the disc $d_1$ from position A to position F, hence, simultaneously, of disc $d_2$ from position P to position A, external circuits are quickly closed and opened, the said circuits being connected to contacts $m_1$, $n_1$ and $k_1$, $x_1$ and a further external circuit is closed, which is connected to contacts $m_2$, $n_2$ and $k_2$, $x_2$ as the disc $d_1$ is held in position F through the engagement of the tooth 18 by the peripheral groove 19 in the said disc.

As the disc $d_2$ moves from position A to position F external circuits are closed which are connected to contacts $m_3$, $n_3$ and $k_3$, $x_3$, and so on. An embodiment of this arrangement is shown in Figure 13.

In Figure 13 B denotes a source of electric current, the opposed poles 30, 31 of which are connected in the windings of eleven relays $w_i$, $w_1 \ldots w_{10}$ of a plurality of relays, the relay $w_i$ being a quick-action relay, the relays $w_1 \ldots w_{10}$ being of the self-exciting type. The circuit of each winding $w_i$ and $w_1 \ldots w_{10}$ closes across one of the pairs of stationary contacts $m_1$, $n_1 \ldots m_{11} \ldots n_{11}$ cooperating with the movable contacts $c_1 \ldots c_{11}$ on the discs $b_1 \ldots b_{11}$ and the contact $a_t$ controlled by a time relay, the winding of which is denoted by $w_t$ in such manner that the said circuit opens as the winding $w_t$ is energized. The circuit of the winding $w_t$ is closed every time one of the movable contacts $e_2 \ldots c_{11}$ connects one of its associated pairs of contacts $k_2$, $x_2 \ldots k_{11}$, $x_{11}$. In this construction the contacts $e_1$, $k_1$ and $x_1$ are omitted, the contact $n_1$ being directly connected to the terminal 31 of the source B of electrical current.

The windings $w_1 \ldots w_{10}$ of the self-exciting relays each control a normally open contact ($a_1 \ldots a_{10}$) connected in an external circuit, such as circuits the operation of which releases the various operations of an electrical dictating machine, and a contact $z_1 \ldots z_{10}$ adapted to close its cooperating self-exciting circuit of its associated winding $w_1 \ldots w_{10}$ through the lead 32 and contact $a_1$ controlled by the quick-action relay $w_1$.

The circuit moreover includes the winding $w_0$ of the previously described electromagnet 21, the circuit of which has connected therein a switch $x/c_t$, the closure of which occurs on energization of the winding $w_t$ of the time relay.

$a_0$ denotes the contact connected in the circuit of the winding $w_i$ and $w_1 \ldots w_{10}$ which is quickly opened on energizing of the winding $w_0$, that is, when the electromagnet 21 operates for releasing the peripheral grooves 19 in the discs from the teeth 18 in order to allow of the discs resuming their inoperative position R.

In other embodiments, such as in connection with telephone networks, the discs can be reduced to ten in number, when the stationary and movable contacts associated with all the discs can be spaced through a constant angle equalling the pitch of the discs required for moving them from one operative position to another.

In the latter case it is possible to carry out the device by assigning to each disc three operative positions, namely "inoperative," "waiting" and "end" position.

The modifications required in this case will be obvious to experts in the branch. It should further be noted that, though the discs as described are formed with peripheral teeth, the latter may be replaced by any equivalent structure, for instance of the type shown in Figure 11. In a similar manner, instead of providing discs on the shaft 2, rocking sectors or plates of any suitable form can be provided. Finally, instead of operating by means of rotary members, I can employ members capable of rectilinear displacement against the action of springs tending to return them to their inoperative position from their end position determined by suitable abutments, Figures 14 and 15.

The operation of a practical embodiment of the improved selector shall now be described. For instance, in order to energize the external circuit having connected therein the contact $a_4$, four electrical impulses in quick sequence shall be transmitted to the relay 14. These impulses can be transmitted from a telephone apparatus provided with a dial by selecting numeral four. On reception of each impulse the relay 14 oscillates the plate 10 and blades $l_1$, $l_2$, $l_3$ and $l_4$ successively engage the teeth $b_1$, $b_2$, $b_3$, and $b_4$. The first oscillation moves the disc $d_1$ from position A to position F and at the same time discs $d_2$ and $d_3$ to the positions A and P, respectively, thereby quickly closing and opening or rotation of the disc $d_1$ the circuit of the quick-action relay $w_i$. This results in opening and closing of the contact $a_i$ and disenergization of the windings $w_1 \ldots w_{10}$ should any of the latter have been energized by a previous control transmitted through the selector. This safely avoids the danger of imparting to the machine to be operated two contrasting controls. The next oscillation of the plate 10 results in movement of the disc $d_2$ from position A to position F and at the same time of the disc $d_3$ from position P to position A and of the disc $d_4$ from the position R to position P. The third oscillation results in movement of the disc $d_3$ from position A to position F, of the disc $d_4$ from position P to position A and disc $d_5$ from position R to position P. The fourth oscillation results in oscillation of the disc $d_4$ from position A to position F, of the disc $d_5$ from the position P to position A and of the disc $d_6$ from position R to position P. It will be seen that at the utmost three discs can be moved simultaneously through a pitch limited to the angle $\alpha$, which may be a small angle. Consequently, the force of the relay 14 can be a low one, the said relay operating with a minimum power consumption. All the discs $d_1 \ldots d_4$ reaching the position F are held therein through the engagement by the teeth 18 on the blades $r_1 \ldots r_4$ of the peripheral grooves 19 in the said discs. Though as the discs $d_2$ and $d_3$ reach their position A, their movable contacts $c_2$, $e_2$ and $c_3$, $e_3$ interconnect their respective stationary contacts, the windings $w_1$ and $w_2$ of the first two mentioned self-exciting relays are not energized, their contacts $a_1$ and $a_2$ remaining open, the provision in their circuit of the contact $a_t$ controlled by the time relay $w_t$ preventing their operation. In fact, the delay inherent to operation of the relay $w_t$ is such that the quick sequence of oscillation, hence the time period during which the stationary contacts $m_2$, $n_2-k_2$, $x_2$ and $m_3$, $n_3-k_3$, $x_3$, respectively are interconnected is insufficient for releasing the relay $w_t$. The latter is released just when the disc $d_4$ is held in the position F. Operation of the relay $w_t$ closes the contact $a_t$, hence energizes the winding $w_4$ which closes the contacts $a_4$ and $z_4$. At the same time, however, the contact $c_t$ closes also supplying current to the winding $w_0$ of the electromagnet 21 which oscillates the plate 17, whereby the teeth 18 on the blades $r_1 \ldots r_4$ are released from the peripheral grooves in the discs $d_1 \ldots d_4$, whereby the latter snap back to their initial positions A, T and R, respectively. Moreover, as the winding $w_0$ is energized, it opens the contact $a_0$ thereby cutting out the connection between the terminal 30 of the source of current B and windings $w_i$, $w_1 \ldots w_{10}$, in order to avoid energization thereof as the movable contacts $c_1 \ldots c_{11}$ and $e_1 \ldots e_{11}$ return onto their respective stationary contacts.

The winding $w_0$ moreover instantaneously opens the normally closed contact $b_0$ connected in the circuit of the winding $w_t$ of the time relay which becomes inoperative. The contacts $a_0$ and $q_0$ can be mechanically closed for instance by taking advantage of the oscillation of the plate 10. The selector is thereby returned to its inoperative position, ready to receive further controls. Until the latter are transmitted the contact $a_4$ is held closed as well as its respective external circuit, because closure of the contact $z_4$ insures self-excitation of the winding $w_4$. The improved selector device affords as compared with the known one-movement devices the following advantages:

(1) Low power consumption; the relay 14 releasing the selector device is energized on each operation a number of times accurately matching the number of impulses transmitted to the selector.

(2) Improved noiselessness in operation, (3) Quicker operation, (4) Possibility of using impulse generators of various types, (5) Enhanced simplicity in construction, hence lower cost and increased reliability in operation of the electrical equipment of the selector. In fact, expensive relays are dispensed with, which are otherwise required for restoring to their inoperative position the movable arms of prior selectors.

In the modified construction shown in Figures 14 and 15 the form of slides $d_1 \ldots d_{11}$ supported by two parallel rods extending through the slots 30 cut in the slides. The slides are fed through the engagement of the catches $g$ with the slits $i$ cut in the back of the slides during oscillation in the direction of the arrow H of the cross member 10 on energization of the electromagnet 14. The catches $g$ are articulated to the cross member 10 at 31 and are urged against the back of the slides by leaf springs 32.

The slides $d$ are held in their end position F through the engagement of the catches 33 in the slits 19 cut in the lower edge of the slides. The catches are mounted for oscillation on the rod 34 secured to the side walls $1a$ and $1b$ of the frame and are upwardly urged by leaf springs 35.

Release of the catches 33 from the slits 19 in the slides takes place during oscillation of the cross member 10 in the direction of the arrow G on energization of the electromagnet 21.

The further constituents of the structure are provided with the same reference characters used to denote corresponding parts in Figures 1 to 13.

What I claim is:

1. Selector operable by electrical impulses for use in automatic telephone exchange systems or selective remote control of utilising machines, comprising a frame, a number of adjacent members mounted in said frame for moving forwardly in the same direction, spring means for each member for opposing its forward movement, stop means for each member for holding it in a given initial position, propelling means common to all said members for successively moving them against the action of said spring means, towards an end position common to all members, arresting means common to all members for holding them as they reach said end position, an electric impulse motor for driving said propelling means common to all members, electrically driven release means for said arresting means common to all members, an engaging means on each member for cooperating with said propelling means, the stop means for the first of said members for holding the latter in its initial position being arranged to hold said first member with its engaging means in engagement with said propelling means ready to be moved towards said end position common to all members upon transmission of one electric impulse to said electric impulse motor, the stop means for the second of said members designed to hold the latter in its initial position being arranged to hold said second member in such an initial position that it shall advance by a stroke equal to that performed by the first member on going over from its initial to its end position to bring its engaging means into engagement with said propelling means, the stop means for the remaining members designed to hold them in their initial position being arranged to hold them in such initial positions, which are the same for all said members, that they shall advance by a stroke twice that performed by said first member on going over from its initial to its end position to bring their engaging means into engagement with said propelling means, said members being provided with means for interengagement of the successive members, said means being arranged to allow a relative movement between successive members equalling in length the stroke performed by said first member on going over from its initial to its end position, said means for interengagement of said first and second and said second and third members being arranged to simultaneously move forward said three members upon the forward movement of said first member from its initial to its end position, said means for interengagement of the members starting from the third member being arranged to start forward movement of the fourth member and remaining members only after the preceding member has performed a forward movement equalling in length the stroke performed by said first member on going over from its initial to its end position.

2. Selector operable by electrical impulses for use in automatic telephone exchange systems or selective remote control of utilising machines, comprising a frame, a stationary shaft in said frame, a number of adjacent discs rotatably mounted on said shaft, spring means for each disc for opposing their rotation in a common direction, stop means for each disc for holding it in a given initial position against the action of said spring means, propelling means common to all discs for successively rotating them against the action of said spring means towards an end position common to all discs, arresting means common to all discs for holding them as they reach said end position, an electric impulse motor for actuating said propelling means, electrically driven release means for said arresting means, an engaging means on each disc for cooperating with said propelling means, said stop means for the first of said discs being arranged to hold the latter with its engaging means in engagement with said propelling means when the selector is inoperative ready to be rotated towards said end position common to all members upon transmission of one electric impulse to said electric impulse motor, the stop means for the second of said discs being arranged to hold the latter in such an initial position that it shall rotate by an angle equal to that by which said first disc rotates as it goes over from its initial to its end position to bring the engaging means on said second disc into engagement with said propelling means, said stop means for the remaining members being arranged to hold them in such similar initial positions that they shall rotate through an angle which is twice the angle through which said first disc moves on going over from its initial to its end position, to bring their engagement means into engagement with said propelling means, said discs being each provided with means for interengagement, the last mentioned means being arranged to allow a relative rotation between adjacent discs through an angle which equals the angle through which said first disc moves on going over from its initial to its end position, said means for interengagement of said first and second and second and third discs being arranged to simultaneously forward rotate said three discs upon rotation of said first disc from its initial to its end position, said means for interengagement of the discs, starting from the third disc, being arranged to start the forward rotation of the fourth and remaining discs only after the preceding disc has performed a forward rotation through an angle equalling the angle through which said first member moves on going over from its initial to its end position.

3. Selector as claimed in claim 1, wherein said interengagement means on said members are in the form of teeth extending from the top of the outer periphery of the members.

4. Selector as claimed in claim 1, wherein said interengagement means on said members are in the form of slits cut in the top of the outer periphery of said members.

5. Selector as claimed in claim 1, wherein said members are eleven in number.

6. Selector as claimed in claim 1, wherein said propelling means is in the form of a plate mounted in said frame rotatably about an axis perpendicular to the direction of movement of said members one spring blade for each member secured to the lower plate face being further provided for cooperating with said interengagement means on said members as the latter reach the position which the first member occupies in the inoperative selector condition.

7. Selector as claimed in claim 1, wherein said arresting means for holding said members in their end position comprises a groove cut in the bottom of the outer periphery of each member and a plate rockingly mounted in said frame about an axis perpendicular to the direction of movement of said members, a blade having a hook-shaped end for each member for engaging the groove cut in said member as the latter reaches its end position and a spring acting on said plate for upwardly pressing said blades against the periphery of said members.

8. Selector as claimed in claim 7, wherein said electrically driven release means for said arresting means is an electromagnet acting on said plate upon its energization for rotating said plate against the action of said spring and disengaging said hook-shaped ends of the blades carried by said plate from the slits cut in the periphery of said members.

9. Selector as claimed in claim 1, wherein said means for interengagement of said members comprises for each member a laterally projecting pin and an opening receiving the end of the pin fast with the adjacent member said opening being of such size as to allow a relative displacement of adjacent members corresponding to that which the first member performs for going over from its initial to its end position.

10. Selector as claimed in claim 1, wherein each member carries a pair of contacts which are movable therewith, a pair of stationary contacts connected to external circuits for each of said movable contacts being further provided, the spacing between said movable contacts and their respective pair of stationary contacts being such that closure of the latter takes place when said members beginning with the second member reach the position corresponding to the initial position of said first member while closure in connection with the first member takes place as it goes over from its initial to its end position.

11. Selector as claimed in claim 1, wherein each member carries a pair of contacts which are movable therewith, a pair of stationary contacts connected to external circuits for each of said movable contacts being further provided, the stationary contacts being so arranged as to be closed by said movable contacts on said members as the latter reach their end position.

12. Selector as claimed in claim 2, wherein said spring means holding said discs in their initial position is in the form of spiral springs connected by their inner and outer ends to the shaft carrying the discs and the discs, respectively.

13. Selector as claimed in claim 2, wherein said stop means for holding said discs in their initial positions is in the form of teeth extending from the discs' faces near their center and projections on the shaft carrying the discs.

14. Selector operable by electrical impulses for use in automatic telephone exchange systems or selective remote control of utilising machines, comprising a frame, a pair of stationary shafts in said frame, a number of slides slidably mounted on said shafts, spring means for each slide for opposing their displacement in a common direction, stop means for each slide for holding it in a given initial position against the action of said spring means, propelling means common to all slides for successively displacing them against the action of said spring means towards an end position common to all slides, arresting means common to all slides for holding them when they reach their end position, an electric impulse motor for actuating said propelling means, electrically driven release means for said arresting means, an engaging means for each slide for cooperating with said propelling means, said stop means for the first of said slides being arranged for holding the latter with its engaging means in engagement with said propelling means when the selector is inoperative and ready to be displaced towards the end position upon transmission of one electric impulse to said electric impulse motor, the stop means for the second slide being arranged for holding the latter in an initial position such that it shall effect a stroke equal to that which said first slide effects as it goes over from its initial to its end position to bring the engaging means on said second slide into engagement with said propelling means, said stop means for the remaining slides being arranged to hold them in similar initial positions such that they shall effect a stroke twice that performed by said first slide as it goes over from its initial to its end position for bringing their engagement means into engagement with said propelling means, said slides being provided with means for interengagement, the last mentioned means being arranged to allow a relative displacement of adjacent slides by an extent equal to the stroke performed by said first slide on going over from its initial to its end position, said means for interengagement between said first and second and second and third slides being arranged to simultaneously forwardly displace said three slides as said first slide goes over from its initial to its end position, said means for interengagement of the slides, beginning with said third slide, being arranged to start their forward displacement only after the preceding slide has performed a forward displacement equal to that which said first slide performs on going over from its initial to its end position.

15. In combination with a selector as claimed in claim 10 an electric circuit embodying a source of current, a first delayed-action relay having one end of its winding connected to one pole of said source of current and the other end to one contact of each of one pair of said stationary contacts cooperating with one movable contact on said members except the first member, the other contact of each of said pairs being connected to the other pole of said source, a second relay shunted across said source, a normally open contact in the circuit of said second relay closing upon actuation of said first relay, a normally closed contact opening upon actuation of said second relay inserted between said one end of the winding of said first relay and said source, a lead connected to one contact of each second pair of stationary contacts cooperating with the other movable contact on each disc, a normally open contact between said lead and said source of current, a self-holding relay having a winding one end of which is connected to the other contact of said second pair of stationary contacts on each member, except the first member, the other end of each of said windings being connected to said other pole of said source of current, a quick-action relay having its winding connected by one end to the second contact of the stationary pair of contacts cooperating with a movable contact on said first member and by its other end to said other pole of said source of current, a normally closed contact between said other end of the winding of said quick-action relay and the other pole of the source of current, said contact being opened upon actuation of said second relay, normally open contacts for each of said self-holding relays each inserted between the ends of their windings connected to said stationary contacts and said one pole of the source of current and closing upon energisation of their windings, and a normally closed contact opening upon energisation of said quick-action relay inserted between said normally open contacts of said self-holding relays and said one source of current.

References Cited in the file of this patent
UNITED STATES PATENTS

| | | |
|---|---|---|
| 1,523,439 | McQuarrie et al. | Jan. 20, 1925 |
| 1,787,292 | Townsend | Dec. 30, 1930 |
| 2,318,204 | Deakin | May 4, 1943 |
| 2,654,846 | Lohs | Oct. 6, 1953 |